Patented May 16, 1950

2,508,332

UNITED STATES PATENT OFFICE 2,508,332

β-PHENYL-β-PYRIDYL AND β-PHENYL-β-PIPERIDYL ETHYL AMINES

Max Hartmann and Leandro Panizzon, Riehen, Switzerland, assignors to Ciba Pharmaceutical Products Inc., Summit, N. J., a corporation of New Jersey No Drawing. Original application March 9, 1945, Serial No. 581,971. Divided and this application December 26, 1946, Serial No. 718,631. In Switzerland January 19, 1944

Section 1, Public Law 690, August 8, 1946
Patent expires January 19, 1964

13 Claims. (Cl. 260—293)

The present application is a division of application Serial No. 581,971, filed March 9, 1945.

According to this invention new pyridine and piperidine compounds are obtained by causing monoarylaceto-nitriles whose acetonitrile radical contains at least one hydrogen atom to react with nuclear halogenated pyridines and piperidines in the presence of agents eliminating hydrogen halide, if desired, replacing one hydrogen atom at the carbon atom linked to the nitrile group by an alkyl radical, transforming the nitrile group in the compounds thus obtained into a methyleneamino group in one or several steps, if desired, converting the resulting pyridines into the corresponding piperidines by means of reducing agents and/or, if desired, further substituting the pyridine or piperidine compounds thus obtained at the ring nitrogen atom.

The monoaryl-acetonitriles used for the reaction may contain a substituent in the methylene group of the acetonitrile radical and one of several substituents in the aryl radical. Examples are:—phenyl-acetonitrile, naphthyl-acetonitrile, α-phenyl-α-alkyl-acetonitriles, such as α-phenyl-α-methyl-acetonitrile, 3-methoxy-phenyl-acetonitrile, 3:4-dimethoxyphenyl-acetonitrile, 3:4-methylene-dioxyphenyl-acetonitrile. Nuclear halogenated pyridines and piperidines are for example:—2-chloro-pyridine, 4-chloro-pyridine, 1-methyl-3-chloro-piperidine. These may also contain further substituents. Thus 2-chloro-5-nitro-pyridine may be used as starting material. The reaction is carried out preferably in inert solvents, such as for example ether, benzene, toluene and the like. For the elimination of the hydrogen halide there are preferably used sodium, potassium, lithium as such or in the form of their amides, hydrides, alcoholates or hydrocarbon compounds, such as for example sodium amide, sodium hydride, potassium-tertiary butylate, potassium-tertiary amylate, butyl-lithium, phenyl-sodium or phenyl-lithium.

If acetonitriles are obtained in this reaction which still contain a hydrogen atom at the carbon atom linked with the nitrile group, this can be replaced by the corresponding alkyl radicals, for example by reaction with alkyl halides, such as methyl, ethyl or diethylaminoethyl chloride in the presence of agents eliminating hydrogen halide.

For the purpose of producing the amines the nitriles are treated with reducing agents. When using α-aryl-α-pyridyl-acetonitriles, the reaction, by suitable selection of the reducing agents and conditions, can be conducted in such a manner that there are formed either β-aryl-β-pyridyl-ethylamines or β-aryl-β-piperidyl-ethylamines. In this reduction of the nitriles to the amines also secondary bases are formed, besides primary bases, depending on the conditions applied. β-phenyl-β-pyridyl-(2)-ethylamine and di-(β-phenyl-β-pyridyl-(2)-ethyl)-amine are thus obtained for example from α-phenyl-α-pyridyl-(2)-acetonitrile in an alcohol solution with hydrogen in the presence of nickel catalyst at a low temperature. The resulting primary and secondary ethylamines can be further substituted in the amino group according to the usual methods.

The pyridylethylamines obtained according to the present process can be converted into the corresponding piperidine compounds by the action of reducing agents which are known for the hydrogenation of pyridine nucleus.

The further substitution at the ring nitrogen atom of the pyridines and piperidines formed in the present process can take place in any stage of the reaction. The corresponding quaternary compounds can thus be produced for example by reaction with alkyl-halides, alkylene-halides, aryl-sulfonic acid esters, dialkyl-sulfates or also arylalkyl-halides. It is also possible to obtain tertiary piperidines by starting from piperidines which are not substituted at the ring nitrogen atom.

The compounds produced according to the present process possess valuable physiological properties and may be used as medicaments or as intermediate products for the preparation of medicaments.

The following examples illustrate the invention, but are not to be regarded as limiting it in any way:—

*Example 1*

80 grams of pulverized sodium amide are gradually added, while stirring and cooling, to a solution of 117 g. of phenyl-acetonitrile and 113 g. of 2-chloropyridine in 400 cc. of absolute toluene. The mixture is then slowly heated to 110–120° C. and maintained at this temperature for 1 hour. Water is added thereto after cooling, the toluene solution is shaken with dilute hydrochloric acid and the hydrochloric acid extracts are made alkaline with concentrated caustic soda solution. A solid mass is separated thereby which is taken up in ethyl acetate and distilled, α-phenyl-α-pyridyl-(2)-acetonitrile passing over at 150–155° C. under 0.5 mm. pressure. When recrystallized from ethyl acetate it melts at 88–89° C., the yield amounting to 135 g.

In similar manner there are obtained α-(3-methoxyphenyl) - α - pyridyl-(2)-acetonitrile of melting point 54–55° C. when starting from 3-methoxyphenyl-acetonitrile and 2-chloropyridine, α-(3:4-dimethoxyphenyl) - α - pyridyl-(2)-acetonitrile of boiling point 192–195° C. under 0.2 mm. pressure when starting from 3:4-dimethoxy-phenyl-acetonitrile and 2-chloropyridine, α-(3:4 - methylene - dioxy - phenyl)-α-pyridyl-(2)-acetonitrile of boiling point 170–180° C. under 0.15 mm. pressure when starting from 3:4-methylene-dioxyphenyl-acetonitrile and 2-chloropyridine, α-naphthyl-(1) - α - pyridyl-(2)-acetonitrile of melting point 87° C. when starting from naphthyl-(1)-acetonitrile and 2-chloropyridine, α-phenyl-α-methyl - α - pyridyl-(2)-acetonitrile of boiling point 145–150° C. under 0.2 mm. pressure when starting from α-phenyl-α-methylacetonitrile and 2-chloropyridine, α-phenyl-α-pyridyl - (4) - acetonitrile of melting point 76–77° C. when starting from phenylacetonitrile and 4-chloropyridine, α-phenyl-α-ethyl-α-pyridyl-(4)-acetonitrile of boiling point 193° C. under 11 mm. pressure when starting from α-phenyl-α-ethyl-acetonitrile and 4-chloropyridine, and α-phenyl-α-[N-methyl-piperidyl-(3)]-acetonitrile of boiling point 140–145° C. under 0.2 mm. pressure when starting from phenyl-acetonitrile and N-methyl - 3 - chloropiperidine.

The indicated α-phenyl - α - alkyl - α - pyridyl-acetonitriles can also be obtained by alkylation of α-phenyl-α-pyridyl-acetonitrile with the corresponding alkyl-halides in the presence of sodium amide.

*Example 2*

20 g. of the α-phenyl-α-pyridyl-(2)-acetonitrile described in Example 1 are dissolved in 150 cc. of absolute ethyl alcohol and reduced at 60–70° C. in an autoclave with hydrogen in presence of 5 g. of nickel catalyst. After the quantity of hydrogen (4 atoms) calculated for the reduction of the —CN— group has been taken up, the decrease of pressure ceases. After suction-filtering the catalyst and evaporating the solution there is obtained an oily substance from which by mixing it with 200 cc. of ethyl acetate and 4 cc. of glacial acetic acid 10 g. of the acetate of the primary base β-phenyl-β-pyridyl - (2) - ethylamine can be precipitated. The acetate melts at 124° C. and the base which has been liberated therefrom boils at 130° C. under a pressure of 0.15 mm. The hydrochloride melts at 210–211° C. The ethyl acetate filtrate is evaporated, the residue is mixed with caustic alkali solution and taken up in ether. The ether residue consists of about 10 grams of the crude secondary base di-[β - phenyl - β - pyridyl-(2)-ethyl]-amine; it melts at 84–85° C. when recrystallized from ether, the hydrobromide melts at 140° C. and the picrate at 179–180° C.

The following amines are prepared in analogous manner: from α-(3-methoxyphenyl)-α-pyridyl-(2)-acetonitrile the β-(3-methoxyphenyl)-β-pyridyl-(2)-ethylamine as hydrochloride of melting point 210–211° C. and the di-[β-3-methoxyphenyl)-β-pyridyl-(2)-ethyl]-amine as picrate of melting point 145° C.; and from α-phenyl-α-pyridyl-(4)-acetonitrile the β - phenyl-β-pyridyl-(4)-ethylamine as hydrochloride of melting point 199° C. and the di-[β-phenyl-β-pyridyl-(4)-ethyl]-amine as picrate of melting point 187° C.

The formation of the primary bases can be favored by hydrogenation of the nitriles in the presence of ammonia. For example there are obtained: β-phenyl-β-pyridyl-(4)-β-ethylamine of boiling point 130–135° C. under 0.2 mm. pressure, β-naphthyl-(1)-β-pyridyl-(2)-ethylamine and β-methylene-dioxyphenyl - β - pyridyl-(2)-ethylamine.

For example the following derivatives can be prepared from the foregoing amines: from β-phenyl-β-pyridyl-(2)-ethylamine by hydrogenation with hydrogen in the presence of platinum catalyst the β-phenyl-β-piperidyl - (2) - ethylamine as acetate of melting point 99° C. and the di - [β-phenyl-β-piperidyl-(2)-ethyl]-amine of melting point 82° C., by condensation with formaldehyde in the presence of formic acid the β-phenyl - β - pyridyl - (2) - ethyl-dimethylamine, as hydrochloride of melting point 190° C., by condensation with 1 mol. of formaldehyde and hydrogenation of the resulting Schiff's base and of the pyridine nucleus with hydrogen in the presence of a platinum catalyst the β-phenyl-β-piperidyl-(2)-ethyl-monomethylamine of boiling point 147–152° C. under 0.1 mm. pressure, by condensation with benzaldehyde and hydrogenation at 20° C. the β-phenyl-β-pyridyl-(2)-ethyl-benzylamine, by condensation with benzaldehyde and hydrogenation at 60–70° C. the β-phenyl - β - piperidyl-(2)-ethyl-benzylamine, by condensation with pyridyl-(3)-aldehyde and hydrogenation of the Schiff's base the β-phenyl-β - pyridyl - (2) - ethyl - [pyridyl - (3) - methyl]-amine of boiling point 190–195° C. under 0.25 mm. pressure, by reaction with cyanamide the β-phenyl-β-pyridyl-(2)-ethyl-guanidine as acetate of melting point 202° C. and the corresponding derivatives from other amines.

Having thus disclosed the invention, what is claimed is:

1. A compound of the formula

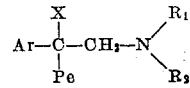

wherein Ar stands for a member selected from the group consisting of monocyclic aryl and condensed bicyclic aryl, X stands for a member selected from the group consisting of hydrogen and lower alkyl, Pe stands for a member selected from the group consisting of pyridine and piperidine radicals, a carbon atom of which is directly connected with C, and

stands for a member selected from the group consisting of amino, lower alkylamino, lower dialkylamino, lower aralkylamino, pyridylamino and

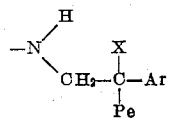

wherein Ar, X and Pe have the precedingly-recited significances.

2. A primary β-phenyl-β-pyridyl-ethylamine.
3. A primary β-phenyl-β-pyridyl-(2)-ethylamine.
4. The β-phenyl-β-pyridyl-(2)-ethylamine.
5. Di-[β-phenyl-β-pyridyl-ethyl]-amine.
6. Di-[β-phenyl-β-pyridyl-(2)-ethyl]-amine.
7. The di-[β-phenyl-β-pyridyl-(2)-ethyl]-amine.
8. A primary β-phenyl-β-piperidyl-ethylamine.
9. A primary β-phenyl-β-piperidyl-(2)-ethylamine.
10. The β-phenyl-β-piperidyl-(2)-ethylamine.
11. Di-[β-phenyl-β-piperidyl-ethyl]-amine.
12. Di-[β-phenyl-β-piperidyl-(2)-ethyl]-amine.
13. The di-[β-phenyl-β-piperidyl-(2)-ethyl]-amine.

MAX HARTMANN.
LEANDRO PANIZZON.

REFERENCES CITED

The following references are of record in the file of this patent:

FOREIGN PATENTS

| Number | Country | Date |
|--------|---------|------|
| 309,300 | Great Britain | Apr. 11, 1929 |

OTHER REFERENCES

Rupe et al., Helv. Chim. Acta 8, 338–340 (1925).

Journal of the American Chemical Society, vol. 66 (1944), pp. 725–731).

Chemical Abstracts 40, 3117[6] (1946).

Hartman, California and Western Medicine 66 (No. 4), 242–248 (1947).

Sidgwick, Organic Chemistry of Nitrogen, page 522.